United States Patent [19]
Lindenmeier et al.

[11] Patent Number: 5,826,179
[45] Date of Patent: *Oct. 20, 1998

[54] MULTI-ANTENNA SCANNING DIVERSITY SYSTEM

[75] Inventors: Heinz Lindenmeier, Planegg; Jochen Hopf, Haar; Leopold Reiter, Gilching, all of Germany

[73] Assignee: FUBA Automotive GmbH, Bad Salzdetfurth, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 561,135

[22] Filed: Nov. 20, 1995

[30] Foreign Application Priority Data

Nov. 23, 1994 [DE] Germany ............... 44 41 761

[51] Int. Cl.$^6$ ............... H04B 1/06; H04B 1/08
[52] U.S. Cl. ............... 455/277.2; 455/278.1; 455/282
[58] Field of Search ............... 455/131–136, 455/145, 190.1, 272, 273, 277.1, 277.2, 278.1, 282

[56] References Cited

U.S. PATENT DOCUMENTS

| | | | |
|---|---|---|---|
| 3,798,547 | 3/1974 | Reudink | 455/272 |
| 4,592,093 | 5/1986 | Ouchi et al. | 455/190.1 |
| 5,548,837 | 8/1996 | Hess et al. | 455/273 |

FOREIGN PATENT DOCUMENTS 3517247 11/1986 Germany.

Primary Examiner—Edward F. Urban
Assistant Examiner—Sam Bhattacharya
Attorney, Agent, or Firm—Michael J. Striker

[57] ABSTRACT

A multi-antenna scanning diversity system uses an antenna diversity circuit adjacent to the antenna terminals, but remote from the receiver, whose input sees the antenna signals (A1) through (AN) and whose output provides a received signal selected by the diversity processor which then goes to the radio receiver via an bidirectional transmission line. The diversity circuit is also fed the radio receiver's IF signal scanned for interference by the diversity processor.

In case of critical interference due to unfavourable reception conditions, the processor generates a switch signal causing another antenna to be selected.

The system uses one common bidirectional transmission to conduct the RF signal from the diversity circuit to the radio receiver and the IF signal from the radio receiver back to the diversity circuit. By a of particular selectivity apparatus the system takes care of preventing the bidirectional transmission signal transfer on the common transmission line to degrade the function of the multi-antenna scanning diversity system.

8 Claims, 3 Drawing Sheets

MULTI-ANTENNA SCANNING DIVERSITY SYSTEM

BACKGROUND OF THE INVENTION

The present invention relates to a multi-antenna scanning diversity system.

More particularly, the invention is based on a multi-antenna scanning diversity system to eliminate reception inferference in the meter wave range, for instance in the FM band, according to the German patent No. 3517247. An example of this type of circuit which is known and is widely used at present, is shown in FIG. 1. In this example a number of antennas are connected to a diversity circuit whose input circuitry comprises a selector switch which in case interference is detected on the signal to be passed to the radio receiver is made to move to its next position. The detector which scans the received signal for interference forms part of the diversity processor which in turn is a part of the diversity circuit. If the antennas are not located immediately adjacent to the radio receiver it is preferable to install the diversity circuit not in the same cabinet with the radio receiver, but close to the antenna system so as to avoid the need of providing a separate transmission line for each antenna. This is of special significance for motor vehicles using a multi antenna system integrated in the rear window. The invention only needs one single RF transmission line between the diversity circuit and the radio receiver in the vehicle front, whereas the state of the art would require a separate transmission line for the IF signal of the radio receiver to the diversity circuit for the diversity processor to scan this signal for unacceptable levels of interference. This IF line would imply additional cost for connectors, cable and its installation in the vehicle body. Moreover, the connectors give rise to additional sources of trouble, reducing the system's operativeness.

SUMMARY OF THE INVENTION

Accordingly, it is an object of the present invention to provide a multi-antenna scanning diversity system which avoids the disadvantages of the prior art.

More particularly it is an object of the present invention to reduce the need of transmission lines for the RF and IF signals to be transferred in a diversity system between the diversity circuit and the radio receiver.

In keeping with these objects and with others which will become apparent hereinafter, one feature of the present invention resides, briefly stated, in a multi-antenna scanning diversity system comprising an antenna terminals, an RF line, a diversity circuit arranged adjacent to said antenna terminals and having a circuit input receiving antenna signals and an output, a radio receiver arranged remotely from said diversity circuit and having an input which receives through said RF line a reception signal selected by said diversity circuit and available at said circuit output, said radio receiver generating an IF signal and supplying it to said diversity circuit to be scanned for interference by said diversity circuit so that in case of critical interference due to unfavorable reception conditions, said diversity circuit generates a switch signal causing another antenna to be selected, wherein in accordance with the new features of the present invention the transfer of the RF receive signal to the radio receiver and the transfer of the IF signal from the radio receiver to a diversity circuit use but one common transmission line and that there are selectivity means to ensure the bidirectional transfer of the signals does not degrade the functionality of the multi-antenna scanning diversity system.

When the multi-antenna scanning diversity system is designed in accordance with the present invention, the objectives of the present invention are achieved.

According to the invention, the multi-antenna scanning diversity system comprises a diversity circuit arranged adjacent to a plurality of antenna terminals at which respective antenna signals appear and including a circuit input at which the antenna signals are input, means for selecting one antenna signal as a RF received signal comprising a modulated RF carrier according to a switch signal provided to the means for selecting, processor means for analyzing an IF signal comprising a modulated IF carrier for interference and for generating the switch signal when a predetermined critical level of interference is detected and a circuit output at which the RF received signal is available;

a radio receiver arranged remotely from the diversity circuit and having an input at which the RF received signal selected by the diversity circuit is received in the radio receiver and means for generating the IF signal including the interference and for supplying the IF signal to the diversity circuit to be scanned for interference by the processor means so that, when the predetermined critical level of interference is detected due to unfavorable reception conditions, the means for selecting selects another antenna signal as the RF received signal in response to the switch signal from the processor means;

a single common bidirectional transmission line through which the RF received signal is supplied to the radio receiver and through which the IF signal is supplied from the radio receiver to the diversity circuit; and selectivity means for guaranteeing that bidirectional transfer of signals over the single common bidirectional transmission line does not degrade operations of the multi-antenna scanning diversity system.

When the multi-antenna scanning diversity system is designed in accordance with the present invention, the objectives of the present invention are achieved.

Complementary to the cost reduction and the increase of operativeness due to the elimination of one transmission line and its pertinent connectors the invention provides the benefit of being compatible with a vehicle's standard electric equipment meaning that only a single bidirectional transmission line is required between the rear-screen and the radio receiver, irrespective of whether the vehicle is provided with a single rear-screen integrated active FM antenna or a rear-screen integrated multi-antenna diversity system.

Without a major fitting operation, a vehicle using a single FM antenna can be refitted with a multi-antenna scanning diversity system by just changing the radio receiver and the electronics for the active antennas near the rear-screen and incorporating the diversity circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
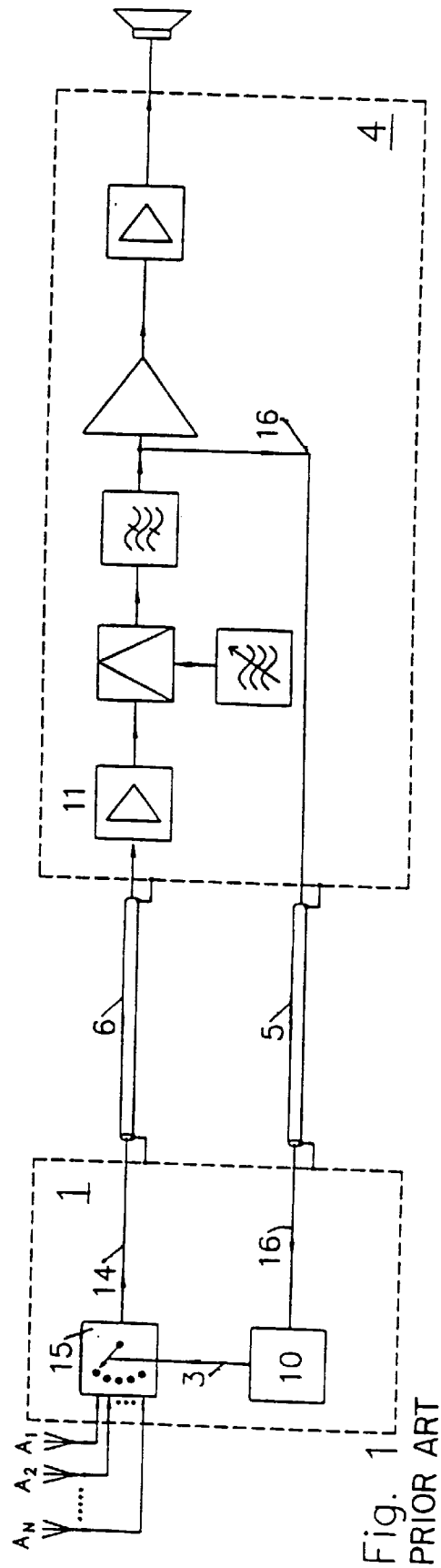
FIG. 1 Multi-antenna scanning diversity system according to the state of the art using a transmission line (6) for RF receive signals and a line (5) for IF signals FIG. 2 Diversity system according to the invention using a common transmission line (6) between the radio receiver (4) and the diversity circuit FIG. 3 Example for a frequency-selective signal separator/combiner creating a first signal path (20) for RF receive signals (14) and a second signal path (21) for IF signals (16)
Figure 2:
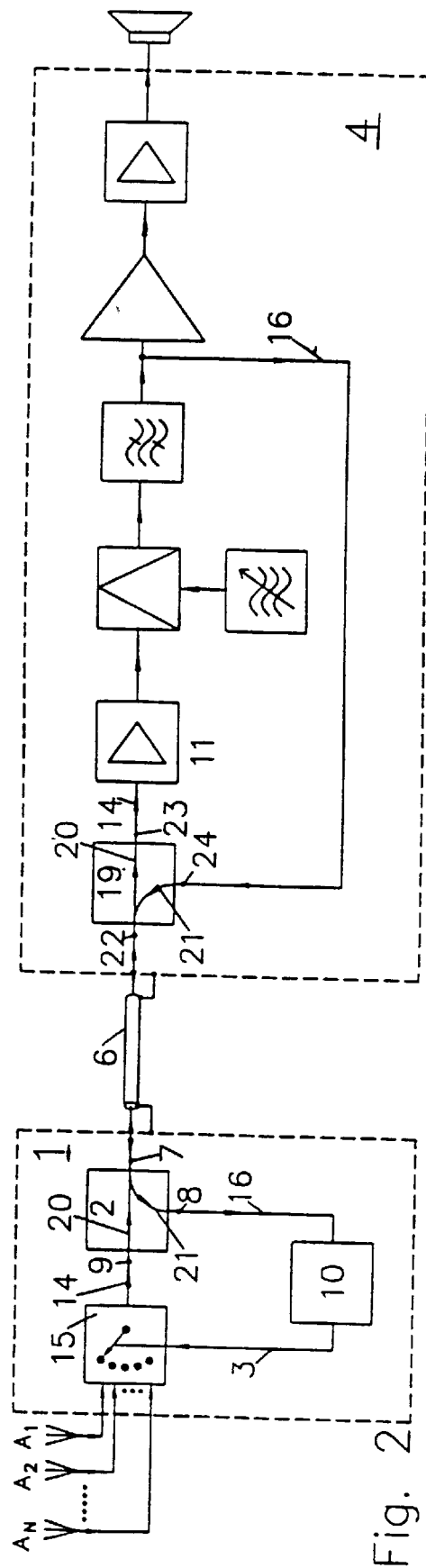

In FIG. 2, the antenna switch selecting according to its momentary position the RF received signal (14) from the antenna signals A1 through AN provided to it, is followed by a signal separator/combiner (2). The separator/combiner (2) is transparent to the RF received signals (14) and passes these signals from the output of the diversity circuit (1) to the bidirectional transmission line (6). According to the invention, another signal separator/combiner (19) with its input terminal (22) is located at the input of the radio receiver (4) providing a first signal path (20) transparent to the RF input signals (14) available at the end of the transmission line (6) flowing towards the radio receiver. The output (23) of the signal separator/combiner (19) is connected to the front end (11) of the radio receiver. The IF signals (16) are derived from the IF section of the radio receiver and conducted to the IF terminal (24) of the signal separator/combiner (19). According to the invention this signal separator/combiner provides a second signal path (21) transparent to the IF signals (16) fed into terminal (24) and flowing towards terminal (22) of the signal separator/combiner (19).

Likewise the separator/combiner (2) in the output of the diversity circuit provides the IF terminal (8) with a second signal path (21) transparent to the IF signals entering at terminal (7) and leaving at terminal (8). These signals are made available to the diversity processor with its distortion detector (10) to be scanned for interference. When a certain level of interference is found the detector actuates the antenna switch (15). For this purpose it is necessary that the two signal paths of the signal separators/combiners (2) and (19) be configured in such a way that no RF received signals couple into the IF signal paths and vice versa so that nor in the diversity circuit (1) neither in the radio receiver (4) can interference result from the transmission line (6) being used for the dual purpose of transmitting RF received signals and IF signals.

According to the invention, the signal separators/combiners (2) and (19) can be designed for frequency selectivity, directional selectivity or a combination of both.

Figure 3:
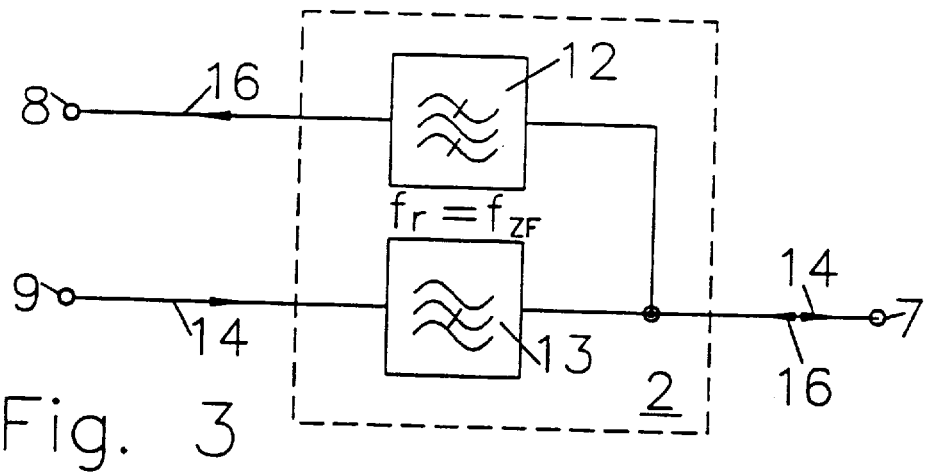

In the example shown in FIG. 3 the signal separator/combiner integrated in the diversity circuit (2) is designed as a combination of a band pass filter for the IF signal (16) in the second signal path (21) with a band stop filter for the IF signal (16) and a band pass filter for the RF signal (14) in the first signal path (20).

Figure 4:
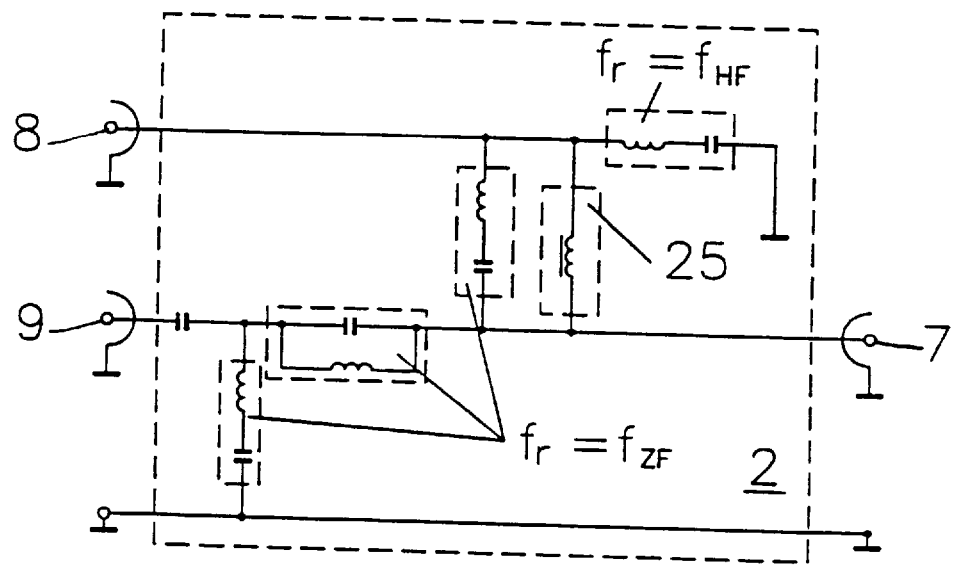
FIG. 4 Example for a frequency-selective signal separator/combiner comprising stop-band and pass-band resonance circuits and a DC or AF coupling means (25) to carry additional information on the second signal path normally used for IF signals FIG. 5 Example for direction-selective signal separators/combiners using directional couplers.

FIG. 4 shows a proposal of how to build the filter combination as per FIG. 3. Here, the signal paths are formed by using rejecting and transparent resonance circuits ($f_r=f_{IF}$) for the IF signals ($f_{IF}$). A further resonance circuit ($f_r=f_{RF}$) designed as a notch circuit for RF received signals protects the IF signal path from RF received signals at terminal (8).

The filter configuration in general is designed in such a way that signals in the AM band are not affected. A sufficiently large inductance (25) allows for additional information to be transmitted through terminal (7) and the transmission line (6) to the radio receiver. This additional information can also be provided as varying DC levels at terminal (8) for transmission to the radio receiver under the condition, however, that the transients of digital level variations at terminal (8) do not comprise any spectral portions to interfere with the IF and RF operation.

For instance, such additional information could be configured in such a way that along with the operation of the antenna switch (15) a pulse is made available to terminal (8) for transmission to the radio receiver (4) via the transmission line (6) to trigger a muting process in the receiver's AF section during the switching operation at the antenna switch (15) in order to suppress any audible interference during the said switching operation.

Figure 5:
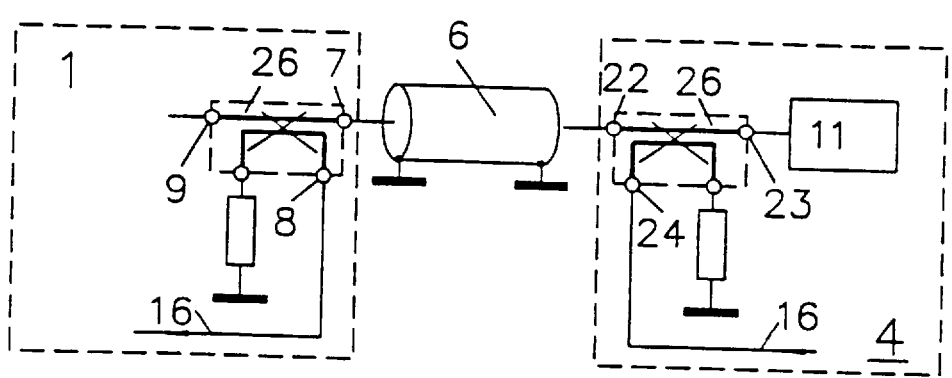

Another preferable design of the invention can be conceived to make use of the routing in opposite directions of the RF received signals (14) and the IF signals (16) on the bidirectional transmission line (6) in order to separate the signals in the signal separators/combiners (2) and (19) by means of directional couplers (26). A circuit principle following this proposal is shown in FIG. 5.

It will be understood that each of the elements described above, or two or more together, may also find a useful application in other types of systems differing from the types described above.

While the invention has been illustrated and described as embodied in a multi-antenna scanning diversity system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A multi-antenna scanning diversity system, comprising a diversity circuit (1) arranged adjacent to a plurality of antenna terminals at which respective antenna signals appear, said diversity circuit comprising a circuit input at which said antenna signals are input, means (15) for selecting one of said antenna signals as a RF received signal according to a switch signal provided to said means for selecting, processor means (10) for analyzing an IF signal for interference and for generating said switch signal when a predetermined critical level of said interference is detected and a circuit output at which said RF received signal is available, said RF received signal comprising a modulated RF carrier and said IF signal comprising a modulated IF carrier;

a radio receiver (4) arranged remotely from said diversity circuit (1) and having an input at which said RF received signal selected by said diversity circuit is received in the radio receiver and means for generating said IF signal and for supplying said IF signal to said diversity circuit to be scanned for said interference by said processor means (10) so that, when said predetermined critical level of said interference is detected due to unfavorable reception conditions, said means (15) for selecting selects another of said antenna signals as said RF received signal in response to said switch signal from said processor means;

a single common bidirectional transmission line (6) through which said RF received signal comprising said modulated RF carrier is supplied to said radio receiver (4) and through which said IF signal comprising said modulated IF carrier is supplied from said radio receiver (4) to said diversity circuit (1); and selectivity means for guaranteeing that bidirectional transfer of said signals over the single common bidirectional transmission line (6) does not degrade operations of the multi-antenna scanning diversity system.

2. A multi-antenna scanning diversity system as defined in claim 1, wherein said selectivity means includes a first signal separator/combiner (2) provided at said circuit output of said diversity circuit and a second signal separator/combiner (19) provided at said input of said radio receiver, said separators/combiners (2,19) cooperating with said single common bidirectional transmission line so as to create a first signal path (20) for the RF received signal supplied to said radio receiver and a second signal path (21) for the IF signal supplied from said radio receiver to said diversity circuit, so that said first signal path (20) is blocked to a passage of said IF signal and second signal path (21) is blocked to a passage of said RF received signal.

3. A multi-antenna scanning diversity system as defined in claim 2, wherein at least one of said signal separators/combiners (2,19) is provided with directional couplers so as to be direction-selective, said at least one signal separator/combiner having additional frequency selectivity means for enhancing frequency selective properties thereof.

4. A multi-antenna scanning diversity system, comprising a diversity circuit (1) arranged adjacent to a plurality of antenna terminals at which respective antenna signals appear, said diversity circuit comprising a circuit input at which said antenna signals are input, means (15) for selecting one of said antenna signals as a RF received signal according to a switch signal provided to said means for selecting, processor means (10) for analyzing an IF signal for interference and for generating said switch signal when a predetermined critical level of said interference is detected and a circuit output at which said RF received signal is available, said RF received signal comprising a modulated RF carrier and said IF signal comprising a modulated IF carrier;

a radio receiver (4) arranged remotely from said diversity circuit (1) and having an input at which said RF received signal selected by said diversity circuit is received in the radio receiver and means for generating said IF signal and for supplying said IF signal to said diversity circuit to be scanned for said interference by said processor means (10) so that, when said predetermined critical level of said interference is detected due to unfavorable reception conditions, said means (15) for selecting selects another of said antenna signals as said RF received signal in response to said switch signal from said processor means;

a single common bidirectional transmission line (6) through which said RF received signal comprising said modulated RF carrier is supplied to said radio receiver (4) and through which said IF signal comprising said modulated IF carrier is supplied from said radio receiver (4) to said diversity circuit (1); and selectivity means for guaranteeing that bidirectional transfer of said signals over the single common bidirectional transmission line (6) does not degrade operations of the multi-antenna scanning diversity system;

wherein said selectivity means includes a first signal separator/combiner (2) provided at said circuit output of said diversity circuit and a second signal separator/combiner (19) provided at said input of said radio receiver, said separators/combiners (2,19) cooperating with said single common bidirectional transmission line so as to create a first signal path (20) for the RF received signal supplied to said radio receiver and a second signal path (21) for the IF signal supplied from said radio receiver to said diversity circuit, so that said first signal path (20) is blocked to a passage of said IF signal and second signal path (21) is blocked to a passage of said RF received signal; and wherein at least one of said two signal separators/combiners (2,19) is frequency-selective, said first signal path (20) is provided with frequency filter means so as to be transparent to said RF received signal and to be blocked to said IF signal, while said second signal path (21) is provided with filter means so as to be transparent to said IF signal and blocked to said RF received signal.

5. A multi-antenna scanning diversity system as defined in claim 4, wherein said filter means of said signal separators/combiners include exclusively IF rejecting and IF transparent filters.

6. A multi-antenna scanning diversity system, comprising a diversity circuit (1) arranged adjacent to a plurality of antenna terminals at which respective antenna signals appear, said diversity circuit comprising a circuit input at which said antenna signals are input, means (15) for selecting one of said antenna signals as a RF received signal according to a switch signal provided to said means for selecting, processor means (10) for analyzing an IF signal for interference and for generating said switch signal when a predetermined critical level of said interference is detected and a circuit output at which said RF received signal is available, said RF received signal comprising a modulated RF carrier and said IF signal comprising a modulated IF carrier;

a radio receiver (4) arranged remotely from said diversity circuit (1) and having an input at which said RF received signal selected by said diversity circuit is received in the radio receiver and means for generating said IF signal and for supplying said IF signal to said diversity circuit to be scanned for said interference by said processor means (10) so that, when said predetermined critical level of said interference is detected due to unfavorable reception conditions, said means (15) for selecting selects another of said antenna signals as said RF received signal in response to said switch signal from said processor means;

a single common bidirectional transmission line (6) through which said RF received signal comprising said modulated RF carrier is supplied to said radio receiver (4) and through which said IF signal comprising said modulated IF carrier is supplied from said radio receiver (4) to said diversity circuit (1); and selectivity means for guaranteeing that bidirectional transfer of said signals over the single common bidirectional transmission line (6) does not degrade operations of the multi-antenna scanning diversity system;

wherein said selectivity means includes a first signal separator/combiner (2) provided at said circuit output of said diversity circuit and a second signal separator/combiner (19) provided at said input of said radio receiver, said separators/combiners (2,19) cooperating with said single common bidirectional transmission line so as to create a first signal path (20) for the RF received signal supplied to said radio receiver and a second signal path (21) for the IF signal supplied from said radio receiver to said diversity circuit, so that said first signal path (20) is blocked to a passage of said IF signal and second signal path (21) is blocked to a passage of said RF received signal;

wherein at least one of said two signal separators/combiners (2,19) has directional couplers so as to be direction selective, so that said first signal path (20) is open only to signals directed to said radio receiver and therefore to said RF received signal and is closed to said IF signal directed to said diversity circuit and so that said second signal path (21) is open only to signals directed to said diversity circuit and therefore only to said IF signal and closed to said RF received signal directed to said radio receiver.

7. A multi-antenna scanning diversity system, comprising a diversity circuit (1) arranged adjacent to a plurality of antenna terminals at which respective antenna signals appear, said diversity circuit comprising a circuit input at which said antenna signals are input, means (15) for selecting one of said antenna signals as a RF received signal according to a switch signal provided to said means for selecting, processor means (10) for analyzing an IF signal for interference and for generating said switch signal when a predetermined critical level of said interference is detected and a circuit output at which said RF received signal is available, said RF received signal comprising a modulated RF carrier and said IF signal comprising a modulated IF carrier;

a radio receiver (4) arranged remotely from said diversity circuit (1) and having an input at which said RF received signal selected by said diversity circuit is received in the radio receiver and means for generating said IF signal and for supplying said IF signal to said diversity circuit to be scanned for said interference by said processor means (10) so that, when said predetermined critical level of said interference is detected due to unfavorable reception conditions, said means (15) for selecting selects another of said antenna signals as said RF received signal in response to said switch signal from said processor means;

a single common bidirectional transmission line (6) through which said RF received signal comprising said modulated RF carrier is supplied to said radio receiver (4) and through which said IF signal comprising said modulated IF carrier is supplied from said radio receiver (4) to said diversity circuit (1); and selectivity means for guaranteeing that bidirectional transfer of said signals over the single common bidirectional transmission line (6) does not degrade operations of the multi-antenna scanning diversity system;

wherein said selectivity means includes a first signal separator/combiner (2) provided at said circuit output of said diversity circuit and a second signal separator/combiner (19) provided at said input of said radio receiver, said separators/combiners (2,19) cooperating with said single common bidirectional transmission line so as to create a first signal path (20) for the RF received signal supplied to said radio receiver and a second signal path (21) for the IF signal supplied from said radio receiver to said diversity circuit, so that said first signal path (20) is blocked to a passage of said IF signal and second signal path (21) is blocked to a passage of said RF received signal;

wherein said separators/combiners in said second signal path (21) include a low-band transparent coupling element for transmission of additional information from an IF terminal (8) of said first separator/combiner through said single common bidirectional transmission line to an IF terminal (24) of said second signal separator/combiner.

8. A multi-antenna scanning diversity system as defined in claim 7, wherein said coupling element has an inductance (25) with a high impedance in an AM frequency range.

* * * * *